(12) United States Patent
Burns et al.

(10) Patent No.: US 8,419,038 B2
(45) Date of Patent: Apr. 16, 2013

(54) FIFTH WHEEL TRAILER HITCH WITH LOCKING MECHANISM

(76) Inventors: Darrel J. Burns, Park City, UT (US); Brigitte Paula Strecker Burns, Park City, UT (US)

(*) Notice: Subject to any disclaimer, the term of this patent is extended or adjusted under 35 U.S.C. 154(b) by 102 days.

(21) Appl. No.: 13/135,578

(22) Filed: Jul. 8, 2011

(65) Prior Publication Data

US 2013/0009386 A1  Jan. 10, 2013

(51) Int. Cl.
*B62D 53/08* (2006.01)
(52) U.S. Cl.
USPC ........ 280/441.2; 280/496; 280/495; 280/498; 280/417.1; 280/507; 280/901
(58) Field of Classification Search ............... 280/441.2, 280/496, 417.1, 495, 498, 507, 901
See application file for complete search history.

(56) References Cited

U.S. PATENT DOCUMENTS

| 5,058,915 A | 10/1991 | Burns |
| 7,712,761 B2 * | 5/2010 | Mater et al. .................. 280/474 |
| 7,871,096 B2 * | 1/2011 | Colibert-Clarke et al. 280/438.1 |
| 7,988,177 B2 * | 8/2011 | Colibert et al. ............ 280/441.1 |

* cited by examiner

*Primary Examiner* — Tashiana Adams
*Assistant Examiner* — Marlon Arce
(74) *Attorney, Agent, or Firm* — M. Reid Russell

(57) ABSTRACT

A fifth wheel trailer hitch with locking mechanism that includes a pin that extends axially from a pivotal mounting of a platform of a trailer tow bar. The pin is preferably cylindrical and is grooved circumferentially adjacent to its bottom end for fitting into an a key way forward end lip formed in a mounting plate that is attached to a truck bed for prohibiting the pin from lifting from the key way. The pin includes a plug that, by turning a cam rod journaled through the pin, will extend or retract axially from a pin center opening to fit into a plug hole formed in the mounting plate in the center of the key way forward end, preventing, when extended, the pin from sliding therefrom. Which plug, extended by cam rod turning, is a primary lock, and the invention further includes straight rods, as secondary plug locks, arranged for travel through lateral holes in the pin into the pin open center to fit into holes in the plug side when the plug is extended by the primary lock, and further includes as a safety lock, a plate that is fitted into the key way depression to brace the pin in the key way forward end.

7 Claims, 7 Drawing Sheets

FIFTH WHEEL TRAILER HITCH WITH LOCKING MECHANISM

BACKGROUND OF THE INVENTION

1. Field of the Invention

This invention relates to trailer hitches and in particular to couplings for mounting a trailer draw or tow bar end onto a pickup truck bed, and includes multiple locks for holding the trailer hitch to a mount that are individually released to unlock the trailer draw or tow bar end from the mount.

2. Prior Art

It has long been known and in practice to provide a fifth wheel-type hitch for attaching a trailer draw or tow bar end to a pickup truck bed. The inventor of the present invention, who is now deceased, invented a trailer hitch that received a grant of a U.S. Pat. No. 5,058,915, issued Oct. 12, 1991. The present invention is an improvement on this '915 patent. Specifically, where the hitch of the '915 patent includes an effective and reliable primary lock system, it did not include an additional secondary or safety pin locks that are separately operated from the primary lock system and provide a reliable, easily used, safeguard against an unwanted release of the trailer hitch from a mounting plate that is secured to the truck bed. Additionally, the present invention includes a plate lock that, when installed in a pin receiving cavity of the hitch plate, blocks outward passage of a hitch pin as would release the hitch pin. The respective secondary and plate locks, here included, provide a hitch that is safe from an unwanted release and detachment and therefore constitute major improvements over the earlier trailer hitch of one the deceased inventor.

SUMMARY OF THE INVENTION

It is a principal object of the present invention to provide a lock and safety lock system for a fifth wheel trailer hitch that includes a pin as a draw or tow bar end for coupling to a plate that is mounted to a pickup truck bed that includes a cam rod lock that is turned to lock as a primary pin lock to the plate, and further includes, as a secondary lock, a pair of straight rods that are secondary pin locks and will align with and are individually urged into holes formed into opposite sides of the pin when the pin is in a primary locked attitude to the plate, with each rod for further prohibiting an unwanted hitch and plate separation.

Another object of the present invention is to provide a trailer hitch for coupling a trailer draw or tow bar to a pickup truck bed that includes a primary hitch lock for first engagement by turning a cam rod after seating of the pin end in an end of a key way in the plate, followed by operation of secondary locks that are individual straight rods that are to extend into holes in the plug, after which plug has been extended from a pin end into a plug hole formed in the plate key way.

Another object of the present invention is to provide a trailer hitch for coupling to a trailer draw or tow bar, that includes primary and secondary hitch locks, and provides for additional pin locking as a safety lock, that includes a flat safety plate that is shaped to fit into the key way rear end and to fit against the adjacent pin surface when the pin is installed in the forward key way end, and is hinge connected to allow the safety plate to pivot into the key way rear end to block backward travel of the pin end from the key way forward end as a final pin lock.

Still another object of the present invention is to provide a trailer hitch for coupling a trailer draw or tow bar to a pickup truck bed where a plate portion of the hitch that includes the pin receiving hole and is secured in a flat attitude to the pickup truck bed, and is only slightly elevated above the truck bed so as not to hinder a free use of the bed when the hitch is not installed.

Still another object of the present invention is to provide the pin as a male coupling portion of the trailer hitch that extends axially to a depression in the plate key way forward end and which key way forward end depression has a lip or edge for receiving a circumferential groove forward around the pin, adjacent to its lower face, and which pin groove is for traveling into a lip or edge, prohibiting the pin from lifting therefrom, such that, with a plug extended from the pin bottom it will travel into a plug hole formed in the key way forward depression, to block rearward travel of the pin as the primary, safety lock of the invention followed by the operation of the secondary lock of the invention to further restrict and unwanted separation of the pin out from the plate key way.

Still another object of the present invention is to provide an arrangement for extending the plug from the pin bottom face as the pin primary lock that includes a cam rod that has a rod secured to extend axially from its inner face that fits into a lateral hole formed in the plug whereby, when the cam rod is turned at its outer end, it moves the plug up or down to fit it into or lift it from the plug hole in the key way forward depression, locking or unlocking the pin in the key way forward end.

Still another object of the present invention is to provide a trailer hitch that is easy to install, reliable in its use, provides multiple locks, takes up a minimum space and has few moving parts.

The trailer hitch with primary and secondary locks of the present invention includes, as the trailer draw or tow bar end, a pin that is connected axially thereto through a pivot arrangement that allows side to side and front to back tilting. The pin is preferably cylindrical and has a continuous groove formed around it that is adjacent to a flat bottom surface. The pin includes a plug arranged to extend axially from a bottom end face thereof that is to fit into a plug hole formed into a small diameter forward end of a key way that is formed in a mounting plate that is secured onto a truck bed. The key way includes a depression in its forward end that has an edge or lip that receives the pin continuous groove when the truck body is moved into the pin end. The key way forward end has greater diameter than the key way rear end to initially receive the pin end and guides the pin into is lesser diameter forward end, providing for the depression lip or edge travel into the pin continuous groove, preventing lifting of the pin out of the key way forward end whereafter a plug is extended from the plug bottom face that travels into the plug hole that is formed in the key way forward end, with the plug prohibiting rearward travel of the pin.

The pin plug is extended and retracted by turning of a cam rod that is journaled through a side of the pin and has a handle that is secured across its outer end and has a cylindrical shaft mounted off center that extends axially out from a cam rod inner end. The cam rod shaft is for fitting into a hole formed in the side of the pin plug. So arranged, turning of the cam rod lifts or lowers the cylindrical plug between the opposite top and bottom surfaces of the plug lateral hole, functioning as a primary pin lock.

The mounting plate consists of a flat metal plate that has the a key way with rear and forward ends and is for attachment onto the truck bed. The key way rear end has a greater diameter than a lesser diameter opposite forward end that has the lip or edge that the a pin circumferential groove will travel into, for prohibiting the pin from lifting out of the key way.

The mounting plate forward end includes a plug hole that is for receiving the pin plug that is extended from the pin end.

The pin is preferably cylindrical and, as set out above, is for fitting into the key way forward end, to slide therein into the circular key way rear end to where the pin continuous groove receives the edge or lip of the key way forward end portion, seating the pin groove therein and prohibiting the pin from lifting. The pin is restricted from traveling back out of the key way forward end by the extension of the plug axially from the pin end that travels into the key way forward end plug hole by turning the cam rod, functioning as the primary pin lock. The extended plug prohibits the pin from sliding back from the key way forward end to its greater diameter rear end that the pin can lift out of.

The invention includes, as a secondary pin lock, a pair of straight rods that are each for travel in lateral holes formed in the pin that intersection a center pin plug passage. Which lateral holes are each receive a sleeve that travels into the side of the pin, to a sleeve shoulder, and each sleeve includes a longitudinal center hole that is open through the pin body into the pin plug hole. Each straight rod is spring biased by fitting it through a coil spring that is held within the sleeve longitudinal center hole, with its forward end blocked by a shoulder within the sleeve longitudinal center hole and its opposite end in contact with a collar end of the straight rod inner end, providing for a biasing of the coil spring to urge the straight rod in an extended attitude. The plug has holes formed in opposite sides thereof that, with the plug extended such that the plug end will have traveled into the key way forward end plug hole, the plug holes in opposite side thereof will receive align with and receive ends of the straight rods, locking the pin in the plug hole in the key way forward section. With the straight rod end installed in the plug, the pin is prohibited from travel back out of the key way forward end to the rear end where it could be lifted out of the key way. To release the pin, allowing the pin to travel along key way hole edge or lip, the straight rods plug engaging end or ends are withdrawn from the plug hole or holes, and the primary lock is released. To provide for withdrawal of each straight rod end from the plug, the sleeve has an outer head end that engages the pin side, that the straight rod outer end extends from, and which straight rod end is pivotally mounted to the center of an end of an arm that extends across the sleeve outer head end. Which arm may be a section of a channel and has a shoulder arranged to ride on top surface of a sleeve that the straight rod is fitted through, and which should is pivotally secured to the channel arm end. Which pivot coupling is off-set from the arm end such that, when the channel arm is pivoted from a right angle to an axial attitude to the straight rod outer end, the straight rod outer end will be urged outwardly with its coil spring biasing urging the straight rod outer end into the pin plug cavity. In practice, when the channel arm is pivoted to a right angle attitude to the straight rod pivot end, the straight rod end will be retracted and withdrawn from the plug. With both straight rods retracted, the plug is released and can be lifted by turning of the cam rod of the primary lock, to elevate the plug out of the key way mounting plate hole, releasing the pin.

A further pin locking is provided by an inclusion of a flat lock plate that has the outer shape of the key way rear section, wherefrom a crescent section has been removed that has the outer circumference of the adjacent portion of the pin for providing a lock plate that will fit into the key way rear section when the pin is mounted in the key way forward section, blocking travel of back into the rear section. The lock plate is of a thickness such that its top surface aligns with the mounting plate surface when it is installed in the key way rear section. The lock plate preferably is, but may not be, hinge connected to the mounting plate, adjacent to the rear end of the key way to allow the lock plate to be pivoted into the key way forward end, engaging the side of the pin to block pin travel from the key way forward end to the rear end, for locking the pin in the forward end.

As set out above, the pin mount to the trailer draw or tow bar is a pivot coupling. This pivot coupling is preferably through a platform that is pivotally mounted to opposite sides of the pin to tilt forward and rearward and across the pin top face, but may, within the scope of this disclosure, be mounted through a universal joint.

THE DRAWINGS

In the drawings it will be illustrated that which is presently regarded as the best mode for carrying out the invention:

FIG. 1, shows a profile perspective view of the present invention in a trailer hitch with locking mechanism that is shown elevated above a pickup truck bed mounting plate and includes a key way recess formed therein that has a larger diameter rear end and a lesser diameter forward end that has a center recess, shows a pin end pivotally mounted through a platform to opposite sides of the pin and shows a pin plug in broken lines located within a center passage within the pin;

Figure 3:
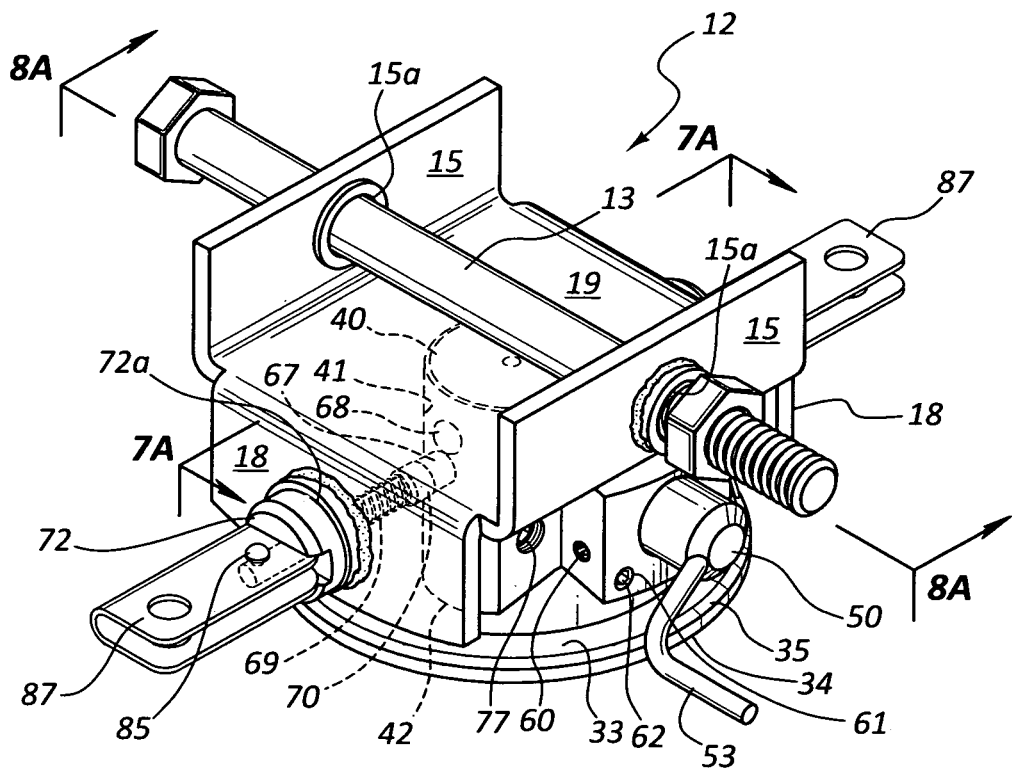
FIG. 3, shows a frontal elevation view taken from the front and right side of the pin of FIGS. 1 and 2, showing the plug in broken lines in a retracted attitude.
Figure 4:
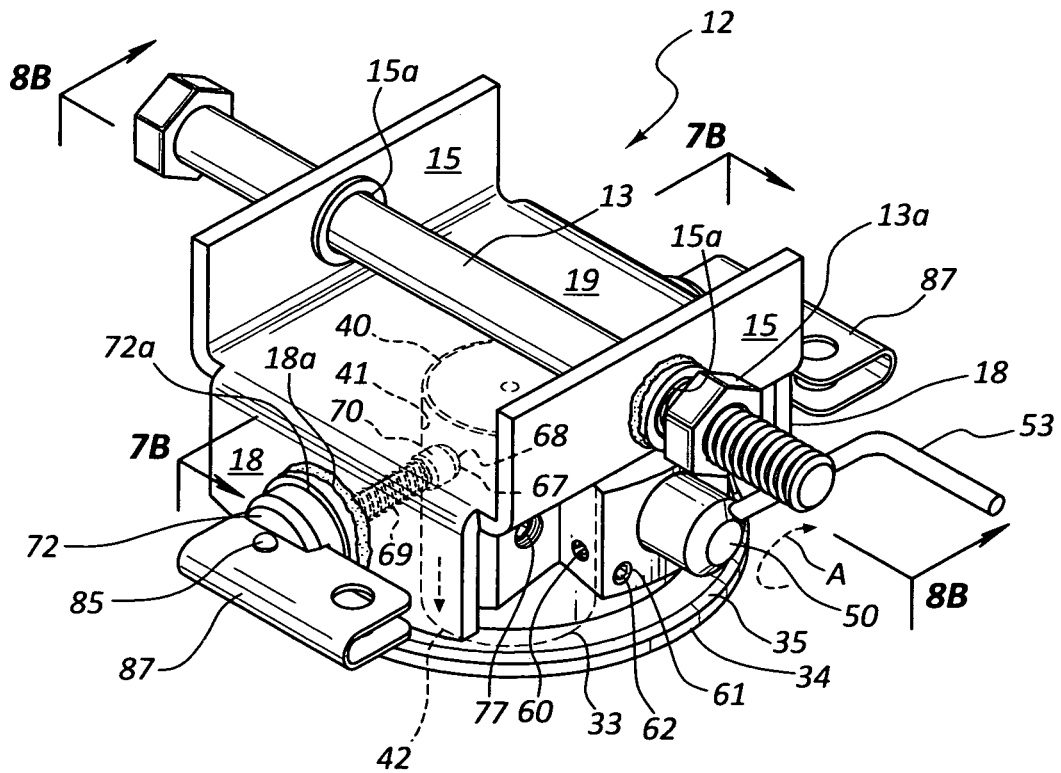
Figure 5:
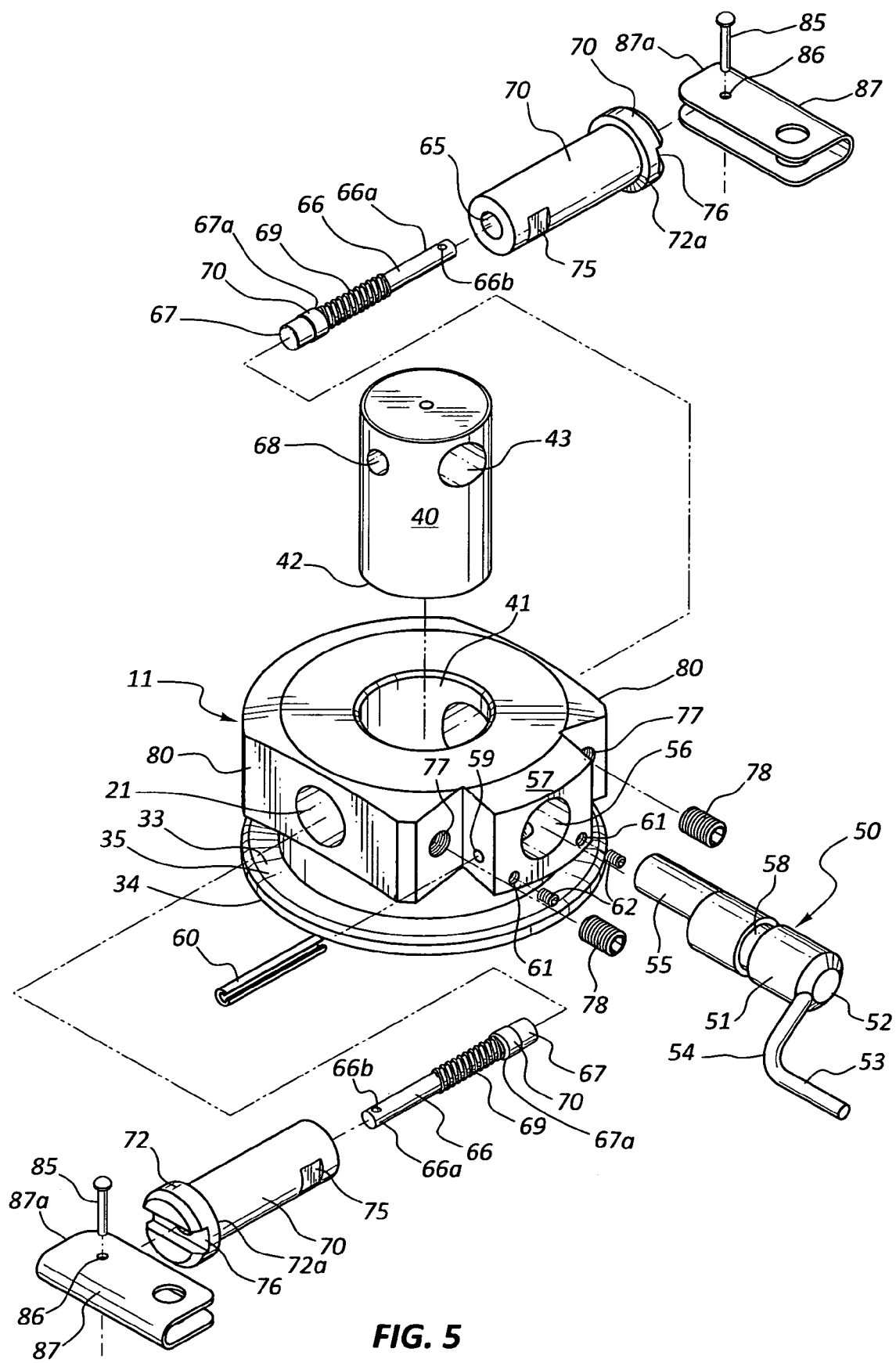
Figure 6:
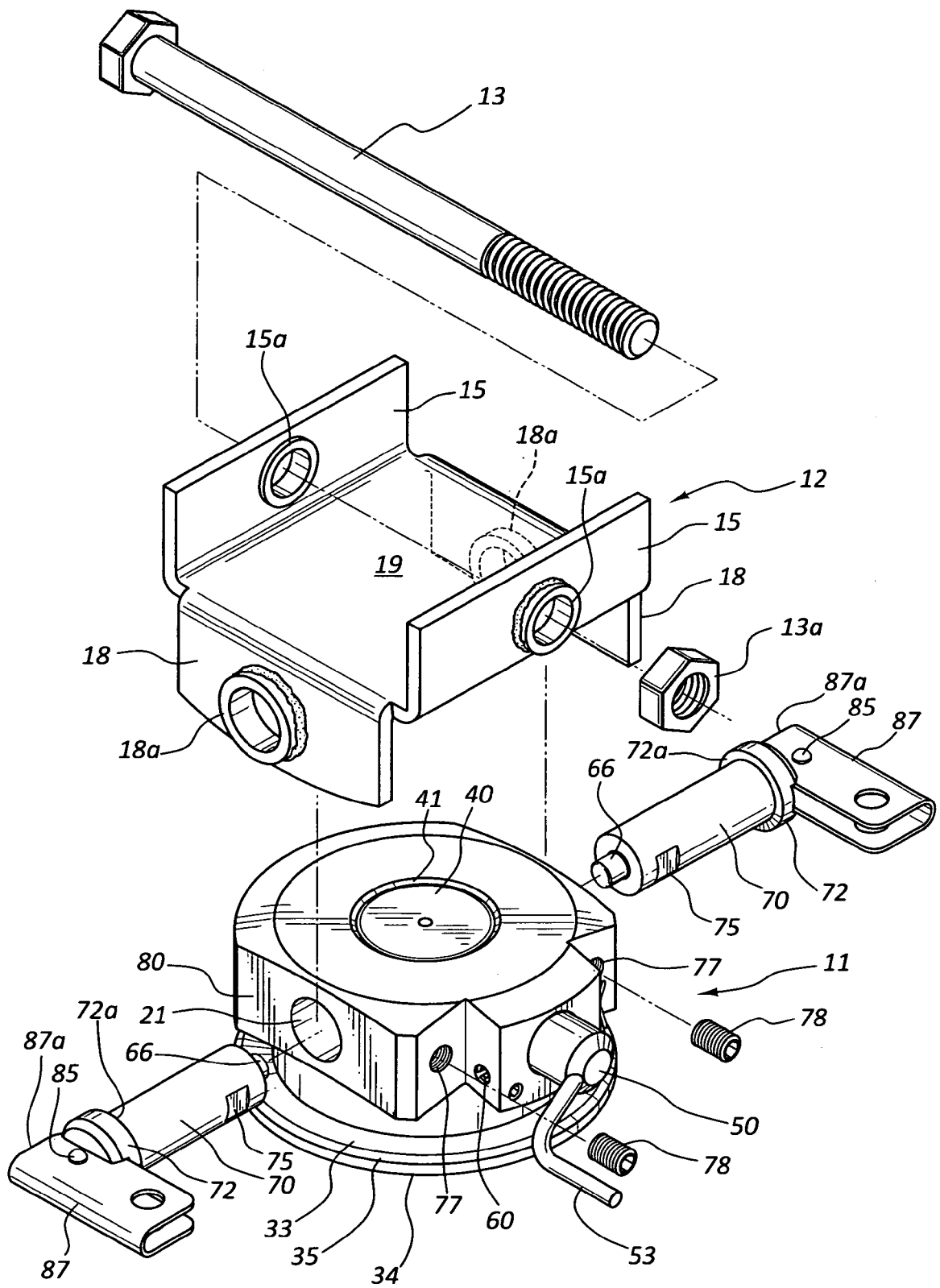
Figure 7A:
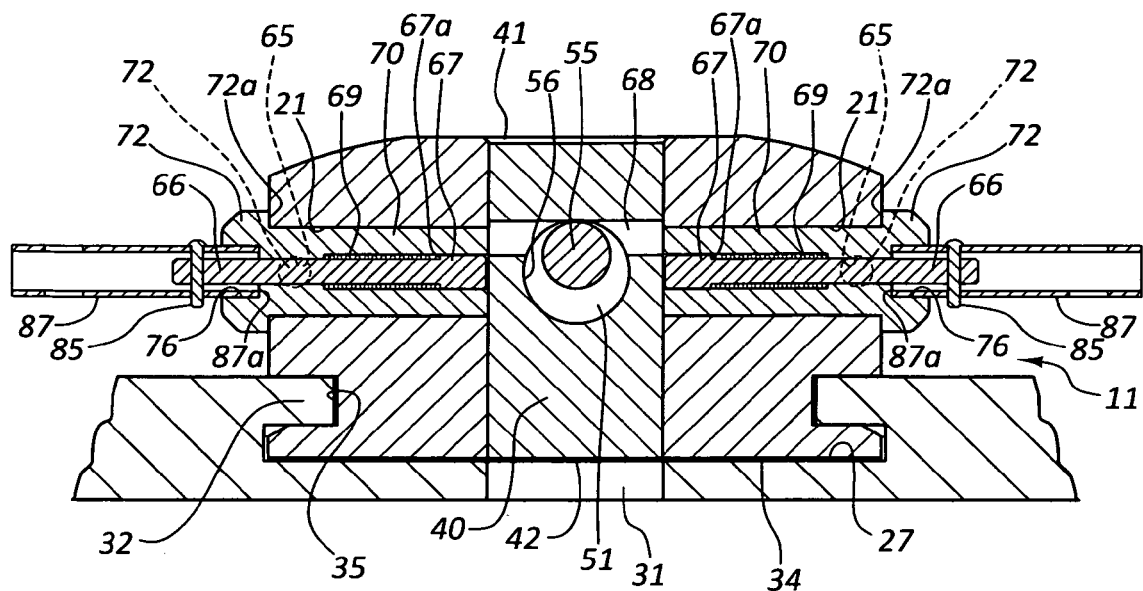
Figure 7B:
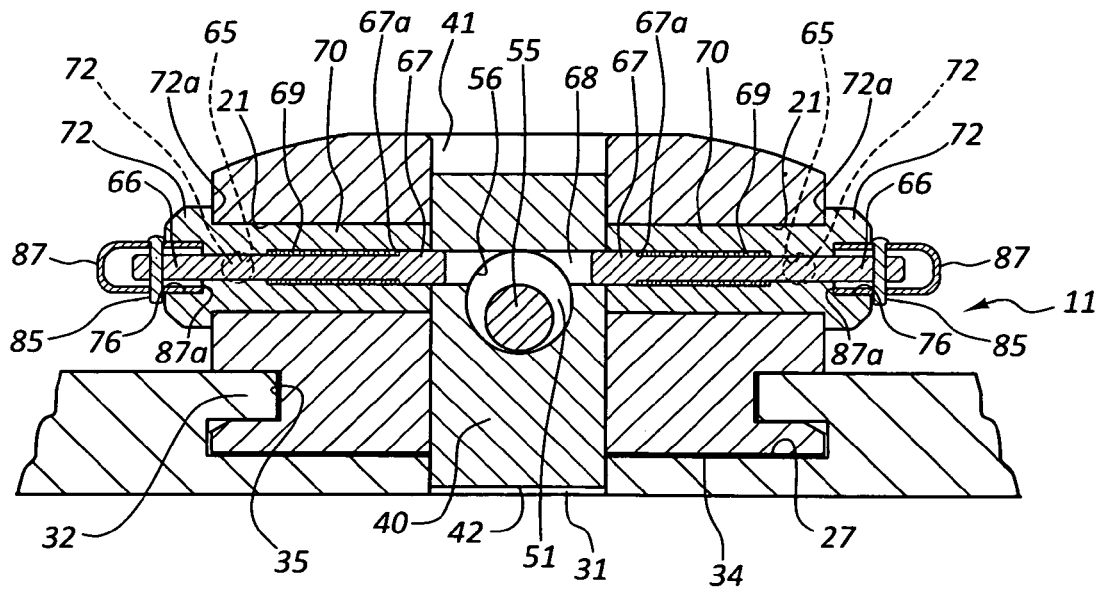
Figure 8A:
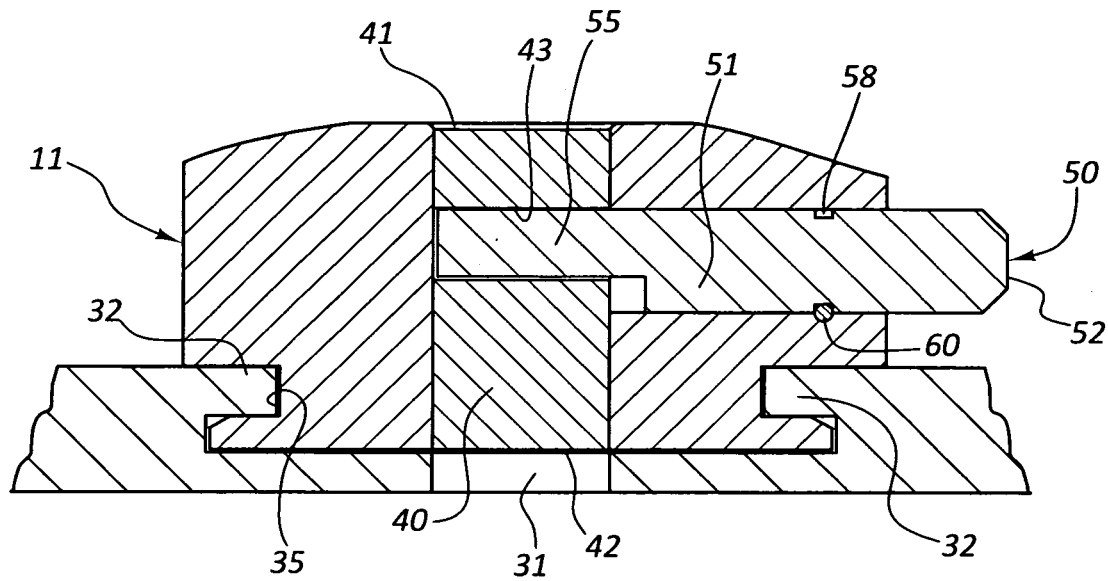
Figure 8B:
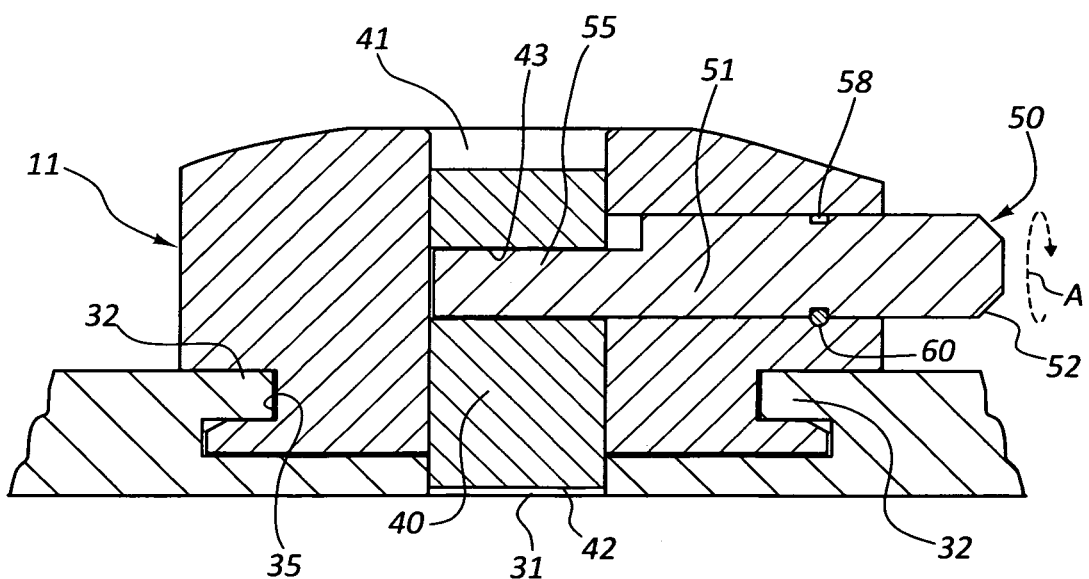

FIG. 4, a view like that of FIG. 3 only showing the plug in broken lines in an extended attitude, and shows spring biased straight rods ends fitted into lateral holes in the plug side as a secondary pin lock;

FIG. 5, is an exploded perspective view of the pin of FIG. 3;

FIG. 6, is an exploded perspective view like that of FIG. 5, only showing the pin as having been partially assembled, and shows a platform aligned for pivotal mounting across a pin top end that is for attachment to a trailer draw or tow bar that is not shown;

FIG. 7A, is a sectional view taken along the line 7A-7A of FIG. 3 before a cam rod is rotated to move the plug to an extended attitude, with the pair of straight rods shown pulled back from the plug sides, and showing the pin circumferential groove as having received the key way forward end edge or lip, prohibiting the pin from lifting;

FIG. 7B is sectional view taken along the line 7B-7B of FIG. 4, showing the cam rod as having been turned to extend the plug, shows the straight rods as having been extended, and showing straight rod ends as having been fitted into plug lateral holes as the secondary pin lock;

FIG. 8A is a sectional view taken along the line 8A-8A of FIG. 3, showing the cam rod position when the plug is in a retracted attitude, reflecting plug positioning before the primary pin lock is engaged; and FIG. 8B is a sectional view taken along the line 8B-8B of FIG. 4, showing the cam rod as having been rotated to extend the plug end into the keyhole rear end center recess and shows the ends of the straight rods extended into the lateral holes formed into opposite sides of the plug as the secondary pin lock.

DETAILED DESCRIPTION OF THE INVENTION

The invention is in a fifth wheel type trailer hitch for mounting a trailer tow or draw bar to a truck bed that includes both primary and secondary hitch pin locks as well as a safety lock, which locks securely maintain a hitch pin in a key way of a mounting plate that is secured to the truck bed. The invention provides separately operated locks to insure that the pin remains locked to the truck bed mounted plate until released.

Figure 1:
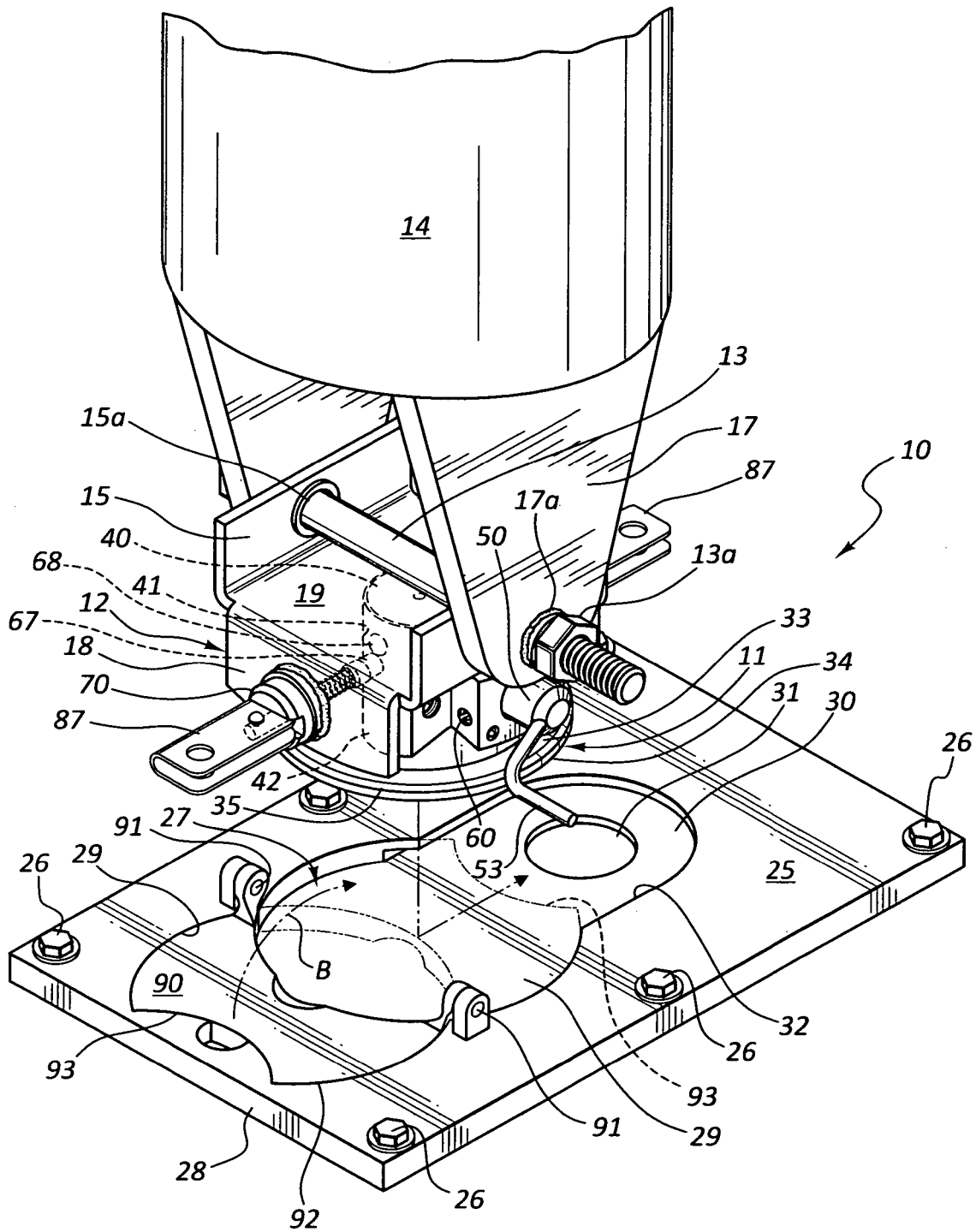
Figure 2:
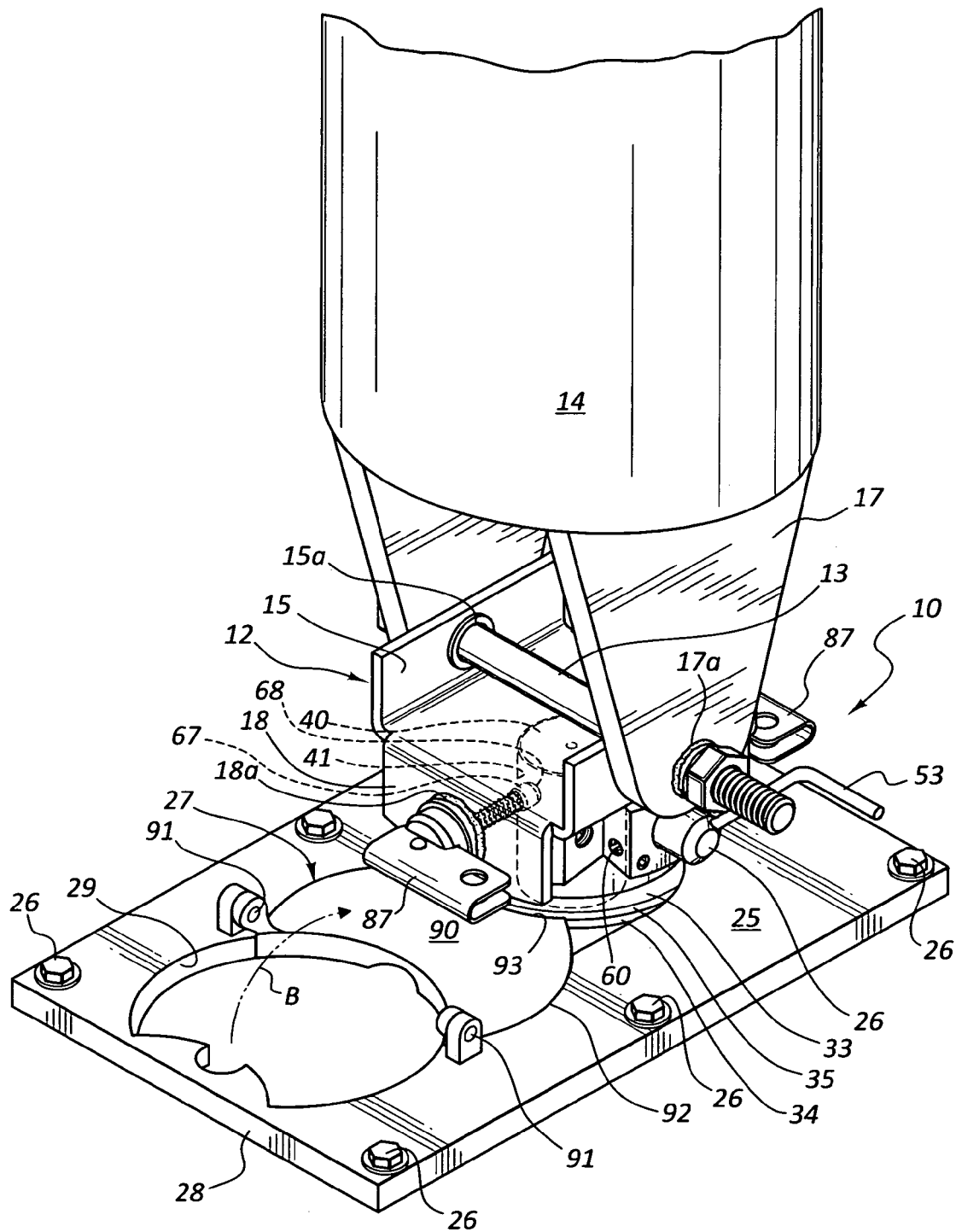
FIG. 2, shows a top plan view of the trailer hitch of FIG. 1, with the pin installed in the key way forward end recess, shows a lock plate whose opposite edge is hinge connected across the key way open rear end and shows the flat plate that is shaped to fit into the key way and rest against the side pin.

FIGS. 1, 2 and 6, show a trailer hitch 10 of the present invention that includes a cylindrical pin 11 connected to a bracket 12 that has a pivot joint 13, with the bracket 12 including a flat square plate 19 having parallel upwardly pointing flanges 15 along opposite sides that have aligned holes 15a that a bolt 13 is fitted through and is also fitted through holes 17a formed through aligned triangular flanges 17 that extend from the undersurface of a draw or tow bar end 14 forming the pivot joint 13. The bracket 12 flat square plate 19 also includes flanges 18 that extend downwardly from the plate sides adjacent to flanges 15 that have aligned holes 18a that each receive a secondary lock sleeves 70, as shown in FIGS. 1, 2, 5 and 6, fitted therethrough and passed into aligned pin holes 21 formed into shoulders 80 that are formed onto opposite sides of pin 11 for connecting the bracket 12 flat square plate 19 to the pin 11. So arranged, the bracket 12 and its pivot coupling through bolt 13 to the draw or tow bar end 14 provides a pivot coupling that allows tilting along a first longitudinal axis of travel from back to front of the pin, and the coupling of the flanges 18 to the pin 11 by secondary lock sleeves 20, provides a second side to side axis of tilt across the pin. The pin 11 is therefor allowed to tilt front to back and side to side relative to the draw or tow bar 14. Where, as set out below, the pin 11 is essentially rigidly mounted to a plate 25 secured to a truck bed, the pivoting couplings of the pin 11 to the bracket 12, and the draw or tow bar end 14 to the bracket, allows for back and forth and side to side movements transmitted from the truck into the trailer, and from the trailer to the truck.

The pin 11 is thereby pivotally mounted by bracket 12 to the draw or tow bar 14, and is rigidly held to mounting plate 25 that is, in turn, rigidly mounted, as by bolts 26, to a truck bed. Shown in FIGS. 1 and 2, mounting plate 25 includes a key way 27 that is laterally centered at a round depression 29 in the mounting plate 25 adjacent to a rear mounting plate end 28, and narrows to a pin mounting rounded forward section or end 30. Which forward end 30 includes a center plug opening 31 and has a lip 32, as shown in FIGS. 7A, 7B, 8A and 8B, around the top of the round forward end 30 that will fit into a groove 35 that is formed in a lower cylindrical portion 33 of pin 11. As shown, the pin cylindrical portion 33 has a flat face 34 to slide freely along the surface or the key way 27 from the depression 29 to forward end 30. In practice, an operator positions the mounting plate 25 under the trailer tow bar end 14 such that the pin 11 cylindrical end 33 is aligned with the key way rear end 28, and then, with the pin face 34 lowered appropriately, backs the truck so as to move the pin end into the key way 27 to where the pin 11 cylindrical end 33 travels into the key way depression 29 and into the key way rounded rear end 30, causing the pin cylindrical end groove 35 to travel under the rear end edge or lip 32, as shown in FIGS. 7A, 7B, 8A and 8B. Thereby, the pin 11 and the attached tow bar end 14 are prohibited from lifting out of the key way 27 rounded forward end 30.

To maintain the pin cylindrical end 33 grove 35 under the key way rounded forward end lip 32, a vertically movable plug 40, as shown in FIGS. 5 through 8B, and in broken lines in FIGS. 1 through 4, is fitted to travel up and down in a cylindrical cavity 41 formed through the pin 11 longitudinal center. With the plug 40 moved downwardly, the plug end 42 travels into the key way 27 forward end 30 center plug opening 31, as shown in FIGS. 2, 4, 7B and 8B, prohibiting the pin 11 from traveling back out of the key way 27 forward end 30. For moving plug 40 up and down with cylindrical cavity 41 the invention employs a cam rod 50 that, shown best in FIG. 5, is a straight rod 51 that has a handle 52 fitted to an outer end 53. Preferably, the cam rod 50 is a solid rod and the handle 52 is bent at 54 to a right angle, forming a crank. The straight rod 51 end, opposite to the crank end, includes a straight shaft 55 that is mounted off-center to extend from the straight rod end. The cam rod 50 is for fitting into a port 56 formed through a shoulder 57 of a pin upper section 11a that ends in the cylindrical cavity 41. The cam rod 50 is for installation into the cylindrical cavity 41, such that the straight shaft 55 fits into a hole 43 formed into the side, near the top, of the plug 40. So arranged, as shown in FIGS. 7A, 7B, 8A and 8B, the straight shaft 55 of the cam rod 50 fits into the plug hole 43, and is for turning, illustrated at arrow A in FIG. 8A, to lower the pin end 42 into the key way forward end 30 center plug hole 31, as shown in FIGS. 7B and 8B, prohibiting the pin 11 from rearward travel out of the key way 27. Shown in FIGS. 7A and 7B, the straight shaft 55 has a diameter to provide a loose fit within the plug hole 43 so as to allow for shaft 55 pivoting without creating a binding of the plug 40 in the cylindrical cavity 41 as would hinder plug up and down travel.

The cam rod 50 is arranged to turn freely in the plug hole 43. For retaining the cam rod in which plug hole 43, as shown in the exploded view of FIG. 5, the cam rod straight rod 51 includes a circumferential groove 58 formed there around that, with the straight rod fitted into the port 56, aligns with a lateral pin hole 59 formed from the shoulder 57 outer surface across the port. A roll pin 60, or like rod type device, is fitted through the lateral pin hole 59 and travels across the circumferential groove 58, both properly positioning the straight rod 51 in, and prohibiting its withdrawal from, the port 56. To securely maintain the roll pin 60, or other like rod type device, in the lateral pin hole 59, one, and preferably two threaded set screw holes 61a and 61b are formed into the cylindrical pin 11 to intersect the lateral pin hole 59 that each receive a set screw 62 turned thereto to engage the roll pin 60, or like rod type device.

Cam rod 50 turning raises and lowers the plug 40. Illustrated by arrow A in FIGS. 4 and 8B, with a clock-wise turn from a nine o'clock position to a three o'clock position that causes the plug 40 to move from a lifted to lowered position in plug hole 31. This lowered position of the plug 40 locks the pin 11 to the mounting plate 25. Which locking also constitutes a primary lock to maintain the pin 11 locked in the key way 27 forward end 30. Which this locked condition can be visually verified by and operator checking the position of the cam rod 50 handle 53, as shown in FIG. 4. Where, as shown in FIG. 3, the handle 53 is at a nine o'clock position, the plug 40 is in a lifted attitude and the pin 11 can travel out of the key way forward end 30.

Additional to the primary lock, as shown in FIGS. 7aA and 7B, the invention includes secondary plug locks are each fitted through a longitudinal center passage 65 of each of a pair of secondary lock sleeves 70, that have each been passed through the flat square plate 19 flanges 18 at holes 18a. Channel arms 87 are aligned with pin holes 86 and receive pins 85 fitted therethrough and through holes 66b in straight rods 66 to function as pivots. The secondary lock sleeves 70 are individually fitted through aligned holes 21 that intersect the pin cylindrical cavity 41, and, in turn, the secondary lock sleeves 70 each have the center longitudinal passage 65, as shown in FIGS. 7A and 7B, that straight rods 66 are individually fitted into. The straight rods 66, as shown in FIGS. 5, 7A and 7B, and in broken lines in FIGS. 3 and 4, each include a head end 67 that is of a diameter to pass into a plug lateral hole 68, that can be a continuous hole, as shown in FIGS. 7A and 7B, or may be separate holes that do not connect, within the scope of this disclosure. In practice, when the plug 40 has been lowered by turning of crank rod 50 into the plate 25 key way 27 forward end 30 center plug opening 31, the plug lateral holes 68 will align with the respective straight rods 66 head ends 67, as shown in FIGS. 4 and 7B. Threat, by urging the individual straight rods 66 head ends 67 into each of the plug lateral holes 68, as shown in FIG. 5, a double secondary locking of the plug 40 in the center plug opening 31 is provided. It should, therefore, be understood that the straight rods 66 can be extended individually, with each to provide plug locking in the center plug opening, but can, and preferably are, both extended at approximately the same time as the secondary pin 11 lock of the invention.

Each of the straight rods 66 are preferably spring biased to a plug locked attitude by a coil spring 69 that is installed on the straight rod 66, between an inner shoulder 67a of the head end 67 and a shoulder that is formed within the passage 65 through the secondary lock sleeve 70. Which secondary lock sleeve includes a head end 72 that has an inner lip 72a that engages and braces against the edge of an aligned hole 21. As shown in FIGS. 5 and 6, to secure the secondary lock sleeve 70 in which aligned holes 21, the sleeve includes a notch 75 formed in its outer surface in alignment with a slot 76 formed across the outer surface of the head end 72 that aligns with a threaded hole 77 formed in each of the shoulders 80 that each receive a set screw 78 turned therein. So arranged, each set screw 78 end engages the secondary lock sleeve 70 notch 75, providing a fixed mounting of the secondary lock sleeve 70 in each of the aligned holes 21.

Shown in FIG. 5, for providing back and forth travel of the straight rods 66, a straight rod outer end 66a includes a lateral hole 66b that is to receive a pin 85 fitted therethrough and through opposing holes 86 formed in a opposite sides of a channel arm 87, for pivotally attaching the end of channel arm 87 to the straight shaft end 66a, and spaced from the channel arm 87 end 87a. The sides of the channel arm 87 are spaced apart to fit between the walls of slot 76. The spacing of the holes 86 from the channel arm end 87a is selected to maintain the straight rod 66a in a retracted attitude when the channel arm 87 extends axially from the secondary lock sleeve 70 head end 72 slot 76, maintaining the straight shaft 66 in a retracted attitude, as shown in FIG. 3, compressing coil spring 69. When, however, the channel arm 87 is pivoted to the attitude shown in FIG. 4 the holes 86 are moved closer to the outer end of center longitudinal passage 65, allowing the coil spring 69 to unload, urging the straight rod head end 67 to travel into a lateral hole 68 of plug 40, locking the plug in an extended attitude with its end 42 installed in key way 27 forward end 30 center plug opening 31. The straight rods 66 can be extended or retracted individually, to provide the secondary locking of the plug 40 in the key way 27 forward end 30 center plug opening 31 of the invention.

The invention further includes a safety lock, as shown in FIGS. 1 and 2, that is a flat lock plate 90 that is connected across a rear end of the key way rear end 29 by hinges 91 to the mounting plate 25. The hinges 91 allow the lock plate 90 to be pivoted from a flat attitude resting on the mounting plate rearwardly from the key way rear end 29, as shown in FIG. 1, to fit within the key way 27 depression 29, with a forward plate end 93 is curved to have a crescent shape to fit against the side of pin 11, as illustrated by arrow B in FIGS. 1 and 2. The lock plate sides are curved at 92 to fit snugly in the key way 27 depression 29, and the crescent shaped curve 93 thereof is to fit closely against the side of pin 11 to block rearward travel thereof. The lock plate 90 is arranged to fit snugly in the key way depression 29. In practice, with the lock plate 90 installed in the key way 27, should the plug retract out of the center plug opening 31, pin movement towards the key way depression 29 will be blocked by plate 90.

Herein above is shown a preferred embodiment of our invention in a fifth wheel trailer hitch with locking mechanism. It should, however, be understood that the present disclosure is made by way of example only and that variations thereto are possible within the scope of this disclosure without departing from the subject matter coming within the scope of the following claims and reasonable equivalency thereof, which claims I regard as my invention.

The invention claimed is:

1. A fifth wheel trailer hitch with locking mechanism comprising, a pin having a cylindrical base and top is pivot coupled axially to tilt longitudinally and laterally to an end of a trailer tow bar; a mounting plate for attachment to a truck bed that includes a key way that is a depression formed therein that has a greater diameter for receiving the end of said pin cylindrical base end to slide there along and into a key way lesser diameter rounded forward section; said pin cylindrical base includes a slot formed at least partially around and adjacent to the pin base bottom, that will receive an edge of said key way rounded forward section and seat therein to prevent lifting of said pin from said key way rounded forward section, and said key way rounded forward section includes a center plug opening to receive a plug end fitted therein; said pin includes a center longitudinal passage that said plug fits and slides in, and has a lateral port that intersects said longitudinal passage that receive a cam rod fitted to turn therein that includes a crank outer end and has a straight rod end mounted off-center to a cam rod inner end that pivotally fits into a lateral hole through said plug, with turning of said cam rod crank end to lift or lower said plug in said pin longitudinal passage and functions as a primary lock, maintaining said plug end in said key way center plug opening; and a secondary lock for maintaining said plug end in said key way center plug opening that includes at least one straight rod that is fitted through a lateral hole formed through said pin, above said circumferential groove into said pin longitudinal passage, whose inner end is to fit into a plug lateral hole formed into the side of said plug when said plug is positioned in said key way center plug opening, and an outer end of said straight rod is pivotally connected to an arm whereby, a lifting of said arm to the horizontal, moves an inner end of said straight rod end into said plug lateral hole, locking said plug in place, functioning as the secondary lock.

2. The fifth wheel trailer hitch locking mechanism as recited in claim 1, wherein a pair of straight rods are employed as the secondary lock where each straight rod is fitted into each of a pair of plug lateral holes that are formed, online, into opposite sides of said plug, with straight rod ends to individually fit into each said plug lateral hole; means for extending each said straight rod to move its end into a plug lateral hole.

3. The fifth wheel trailer hitch locking mechanism as recited in claim 2, wherein the straight rods are fitted through sleeves that are installed in lateral pin holes that are formed in the pin and intersect the pin longitudinal passage, and each said sleeve includes a head end having a diameter greater than said pin longitudinal passage, and the pin holes are of a diameter to accommodate said straight rod end, and said straight rods each include a coil spring installed there around that biases said straight rod end toward said plug.

4. The fifth wheel trailer hitch locking mechanism as recited in claim 3, wherein each straight rod includes an arm as the means for extending the straight rod that is pivotally connected to its outer end and has a shoulder that engages a top surface of the sleeve such that a pivoting of said arm from a right angle to said straight rod outer end to an axial attitude thereto lowers said straight rod into the pin longitudinal passage that is as biased by said coil spring to urge said straight rod end into the plug lateral hole.

5. The fifth wheel trailer hitch locking mechanism as recited in claim 4, wherein the arm is formed as a channel having parallel sides and a straight web with an end of said channel adjacent to the pivot connection with the straight rod outer end aligned to engaged the top of the sleeve, and which said sleeve top has a groove formed thereacross to receive said channel side when said channel is at a right angle to the straight rod outer end.

6. The fifth wheel hitch locking mechanism as recited in claim 5, wherein the sleeve has a disk top having a greater diameter than the sleeve body, the groove across a top of said sleeve is formed to accommodate the channel sides fitted therein and the pair of sleeves are fitted into the pin to align with the plug lateral holes when the primary pin lock is engaged.

7. The fifth wheel hitch locking mechanism as recited in claim 1, further including a safety lock that, when installed in the key way depression, will block rearward travel of the pin, and includes a disk shaped lock plate that has a diameter to fit into the key way depression and has a crescent section removed from a forward edge that has the curve of said pin where, by fitting said lock plate into said key way depression, said pin will be blocked from rearward movement; and a pair of hinges are provided that are individually spaced apart and mounted on line to the top of the mounting plate, alongside the key way depression rear end and to aligned points on the edge of said lock plate, allowing said lock plate to be pivoted from a stowed attitude parallel to and rearward of said key way depression into said key way depression.

* * * * *